Feb. 7, 1961  G. WINTER  2,970,477
DEVICE FOR DETERMINING THE SPECIFIC GRAVITY OF
LIQUIDS WHICH CONTAIN GASES SUCH AS MORE
PARTICULARLY CRUDE PETROLEUM
Filed Feb. 25, 1957

Inventor:
Gerhard Winter
by Deanne Steinchy
attorney

United States Patent Office 2,970,477
Patented Feb. 7, 1961

2,970,477
DEVICE FOR DETERMINING THE SPECIFIC GRAVITY OF LIQUIDS WHICH CONTAIN GASES SUCH AS MORE PARTICULARLY CRUDE PETROLEUM

Gerhard Winter, Hindenburgstrasse 5, Quakenbruck, Germany

Filed Feb. 25, 1957, Ser. No. 641,892

Claims priority, application Germany Feb. 24, 1956

1 Claim. (Cl. 73—435)

The invention relates to a device for determining the specific gravity of liquids which contain gases such as more particularly crude petroleum.

The specific gravity of crude oil even though originating from one and the same well fluctuates considerably and cannot therefore be measured by a volumetric method such as that upon which the operation of the customary flow-type meters for liquids incorporated in a closed conduit is based. In fact, the gravity of flowing liquids containing gases could not in the past be measured at all and this has been felt for some time to be a grave want.

The present invention therefore seeks to provide a measuring device for determining the specific gravity of gassy liquids flowing in a closed pipe. To this end the invention proposes to place a measuring instrument into a gas-filled chamber incorporated in the closed pipe and to force the liquid to flow over the instrument.

The gas-filled chamber constitutes a kind of expansion box contrived to form a casing for the instrument, the liquid entering at the top of the casing and leaving it at the bottom.

Details and further features of the invention will hereinafter be more particularly described with reference to the accompanying drawings and also disclosed in the claim.

Several embodiments of the invention, are diagrammatically illustrated by the drawings in which.

Figure 1:
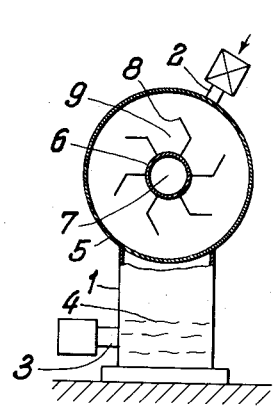
Fig. 1 is a vertical section of a measuring device according to the invention.

Fig. 1 shows a measuring instrument built into a casing 1. The oil is delivered through a pipe 2 at the top of the casing 1 and leaves the casing 1 at the bottom through a pipe 3. The oil level is approximately in line with the oil discharge pipe 3 but it may vary to some extent upwards or downwards. The remainder of the casing 1 is filled with the gas released by the oil and has the same pressure as that of the flowing oil. The upper part 5 of the casing 1 is a horizontal cylinder containing a rotor 6 on a shaft 7. The shaft 7 is coupled with an indicating or recording mechanism of known type, and it also carries a device (not shown) which determines the torque required to turn the rotor. The rotor 6 is constructed in the manner of a paddle wheel, the paddles 8 forming cells 9 into which the oil which enters at a point that is slightly off-centre can flow and thus turn the rotor when it reaches a certain level, i.e. when the cell carries a certain weight of oil. At the bottom the oil is discharged from the cells and flows out through a pipe line 3. The overall diameter of the rotor 6 makes allowance for some clearance between rotor and walls of the casing to permit the gas in the oil to escape.

The operation of this instrument is based on the fact that a heavier oil or a greater volume of oil causes the rotor 6 to turn at greater speed than a lighter oil or an oil passing through the casing at a lower rate. Since the torque required to turn the rotor 6 is known, the weight of the oil which flows over the rotor can be directly calculated or indicated by reference to the speed of revolution of the rotor.

Figure 2:
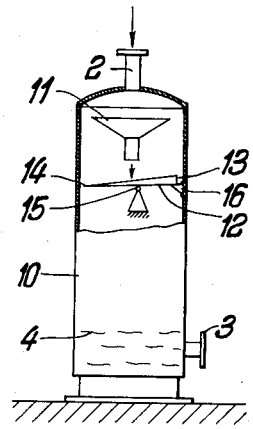
Fig. 2 is a similar section of a modified form of construction.

In Fig. 2 the casing 10 consists of an upright hollow cylindrical body into which the oil is admitted via a delivery pipe 2 at the centre of the top of the casing 10, whereas the oil leaves through an opening 3 near the bottom. The oil level 4 is approximately flush with the exit opening 3 as was the case in the embodiment illustrated in Fig. 1. The upper part of the casing 10 contains a funnel 11 below the admission opening 2 and this funnel feeds the oil on to a preferably rectangular tray 12 provided on three sides with a retaining edge 13 whereas the oil can flow off the remaining fourth edge 14. Parallel with this latter edge 14 the tray 12 is tiltably mounted on a horizontal shaft 15 which is slightly displaced towards the rear edge of the tray in relation to the centre line of the funnel 11. On the wall of the casing 10 is a stop 16 which provides a rest for the edge of the tray 12 opposite the edge over which the oil flows away. This stop retains the tray in a position that is slightly inclined towards this latter edge 14. The oil discharged from the funnel 11 on to the tray 12 will therefore flow down to the edge 14 and tilt the tray 12 about its axis 15 through a certain angle which depends upon the weight of the rear end of the tray 12. Suitable transmission means cause the angle of tilt to be reflected by the position of an indicator or a recorder. Between the outer edge of the funnel 11 and the wall of the casing 10 is a gap which offers a passage for the gas released by the oil.

Figure 3:
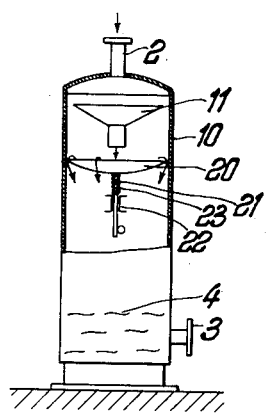
Fig. 3 is a similar section of a further embodiment.

Fig. 3 shows a similar arrangement to that illustrated in Fig. 2 but the tilting tray 12 is here replaced by a hemispherical cup 20 disposed centrally below the funnel 11. The cup 20 is supported by a rod 21 slidably arranged in bearings 22. Between these bearings 22 and the cup 20 is a helical compression spring 23 which urges the cup in the upward direction. The oil which fills the cup 20 depresses the cup against the counterpressure of the spring 23 by an amount which depends upon the weight of the oil, and this deflection is transmitted by suitable transmission means such as a rack and pinion to the indicating or recording mechanism.

Figure 4:
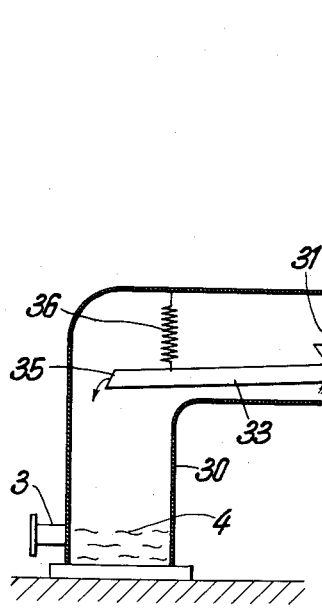
Fig. 4 is a similar section of yet another form of construction.

In Fig. 4 the casing 30 is an upright tubular elbow, the oil being admitted through a pipe 2 at the upper end of the elbow. At 31 the admission pipe 2 is bent in the downward direction and discharges the oil into a funnel 32 arranged at the end of a trough 33. At the end where the funnel is situated the trough 33 is tiltably supported on a horizontal axle 34. The end 35 of the trough 33 remote from the funnel is suspended from a spring 36. The oil flowing down the trough will therefore deflect the trough 33 downwardly through a greater or smaller angle which can then be indicated or recorded as a measure of the weight of the oil in the manner that has already been described. The oil is discharged at 3 at the lower end of the casing 3.

Figure 5:
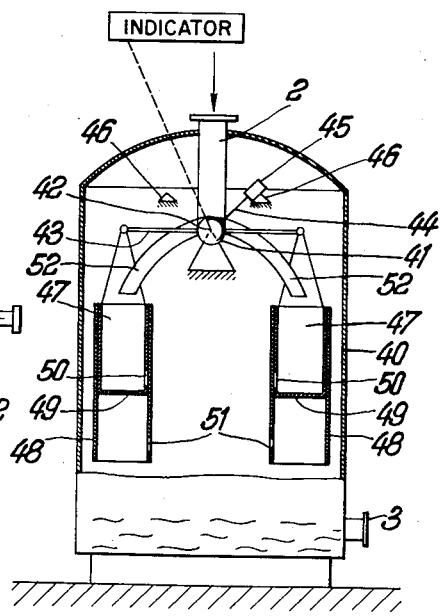
Fig. 5 is a similar section of a fifth embodiment.

In Fig. 5 the admission pipe 2 is arranged in the centre of the casing 40 and the end of the admission pipe 2 is fitted with a rotary two-way valve 41. The shaft 42 of the two-way valve at one end carries an equal-armed balance beam 43 and at the other end a weight 45 attached to a lever arm 44 which can be deflected between fixed stop members 46 in the casing 40. The extremities of the balance beam 43 carry measuring cylinders 47 arranged to slide oil-tight in cylinders 48. Near the floor 49 of the measuring cylinders 47 are outlets 50 arranged to discover ports 51 in the outer cylinders 48 when the measuring cylinders fall. One pipe 52 leads to each of the measuring cylinders 47 from the two-way valve.

This instrument functions as follows:

The oil which enters through the admission pipe 2 and flows through pipe 52 into one of the measuring cylinders 47 causes the latter to fall. As son as the weight 45 is deflected beyond its upper dead centre it will abruptly tip over to the other side and at the same time actuate the two-way valve which will then discharge the oil into the other cylinder whilst the first cylinder is emptied through the openings 50 and 51. This see-saw action continues intermittently and is transmitted through suitable transmission means to the indicating or recording mechanism. In order to tip over weight 45 in the above mentioned manner to the other side, oil of a definite weight must be present in one of the measuring cylinders 47 so that each tipping over of weight 45, which is registered on said recording mechanism, corresponds to and indicates such definite weight of oil. The indicating device is diagrammatically shown in Fig. 5.

It is not intended that the invention should be in any way limited to the embodiments that have been described. The basic principle of the invention admits numerous structural modifications. Any one or more of the features disclosed by the description and in the drawings can be included in an embodiment of the subject matter of the invention. The elements provided to counteract the movement of the measuring elements, whether these consist of torque limiting devices, springs, counterweights, or the like, are preferbaly arranged to be controllably adjustable.

What I claim is:

A device for determining the weight of petroleum and other liquid streams which contain gases, comprising a conduit for conducting a liquid stream constantly under pressure; a pressure vessel inserted in said conduit and having its inlet opening for liquid at its upper end and a discharge opening for liquid at its lower end, for permitting separation of gas and liquid and formation of a liquid layer on the bottom of the pressure vessel and a gas-filled space above said liquid layer, in the pressure vessel; means for measuring the weight of streaming liquid, said means being arranged in the gas-filled space in the pressure vessel and means for transmitting measurings of said measuring means to an indicating device; said measuring means including an inlet pipe extending to the interior of the pressure vessel through said inlet opening and a two-way rotary valve mounted at the inner end of the inlet pipe and a shaft for said rotary valve; a balance beam carried at its centre by said shaft; a lever attached to said shaft and having an adjustable counterweight movable between stationary stop elements provided in the pressure vessel; an upright measuring cylinder carried by each end of said balance beam, each of said measuring cylinders being provided with an opening in its peripheral surface near its bottom; each of said measuring cylinders being arranged to slide liquid-tight in an upright stationary cylinder which is open at both ends and provided at its lower end with a port, in order to permit discharge of liquid from the measuring cylinder through said opening and port, upon movement of the measuring cylinder to registering position of said opening and port.

References Cited in the file of this patent

UNITED STATES PATENTS

| | | |
|---|---|---|
| 787,955 | Stewart et al. | Apr. 25, 1905 |
| 920,741 | Hilaman et al. | May 4, 1909 |
| 1,521,391 | Roach et al. | Dec. 30, 1924 |
| 2,039,997 | Hind | May 5, 1936 |
| 2,284,060 | Knauth | May 26, 1942 |
| 2,372,746 | Stock | Apr. 3, 1945 |

FOREIGN PATENTS

| | | |
|---|---|---|
| 134,843 | Germany | Oct. 13, 1902 |
| 154,315 | Great Britain | Nov. 22, 1920 |